Dec. 13, 1938.  L. L. CADWELL  2,140,150
CARCASS TREATMENT MEANS
Filed Oct. 11, 1937  2 Sheets-Sheet 2
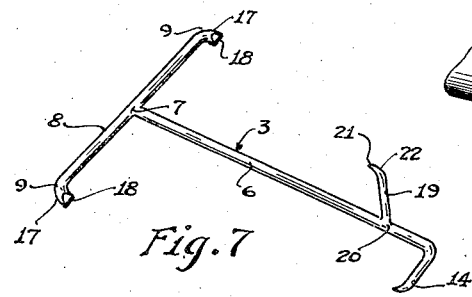
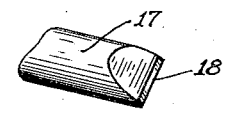
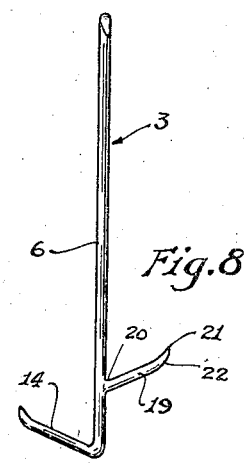
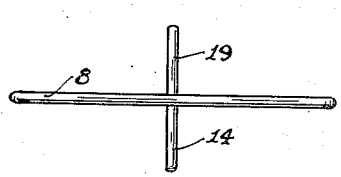
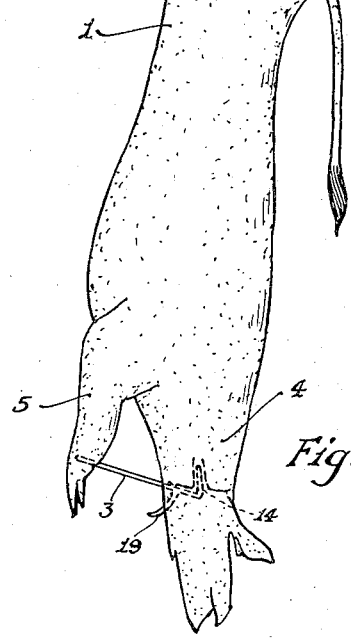
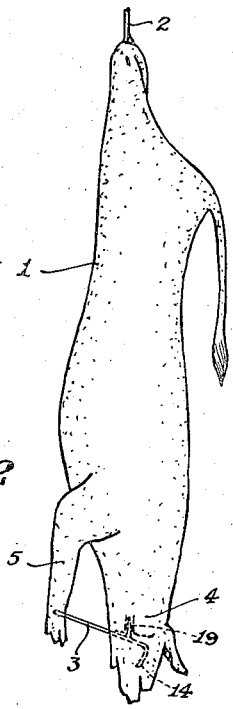
Inventor
Leon L. Cadwell
Attorney Patented Dec. 13, 1938

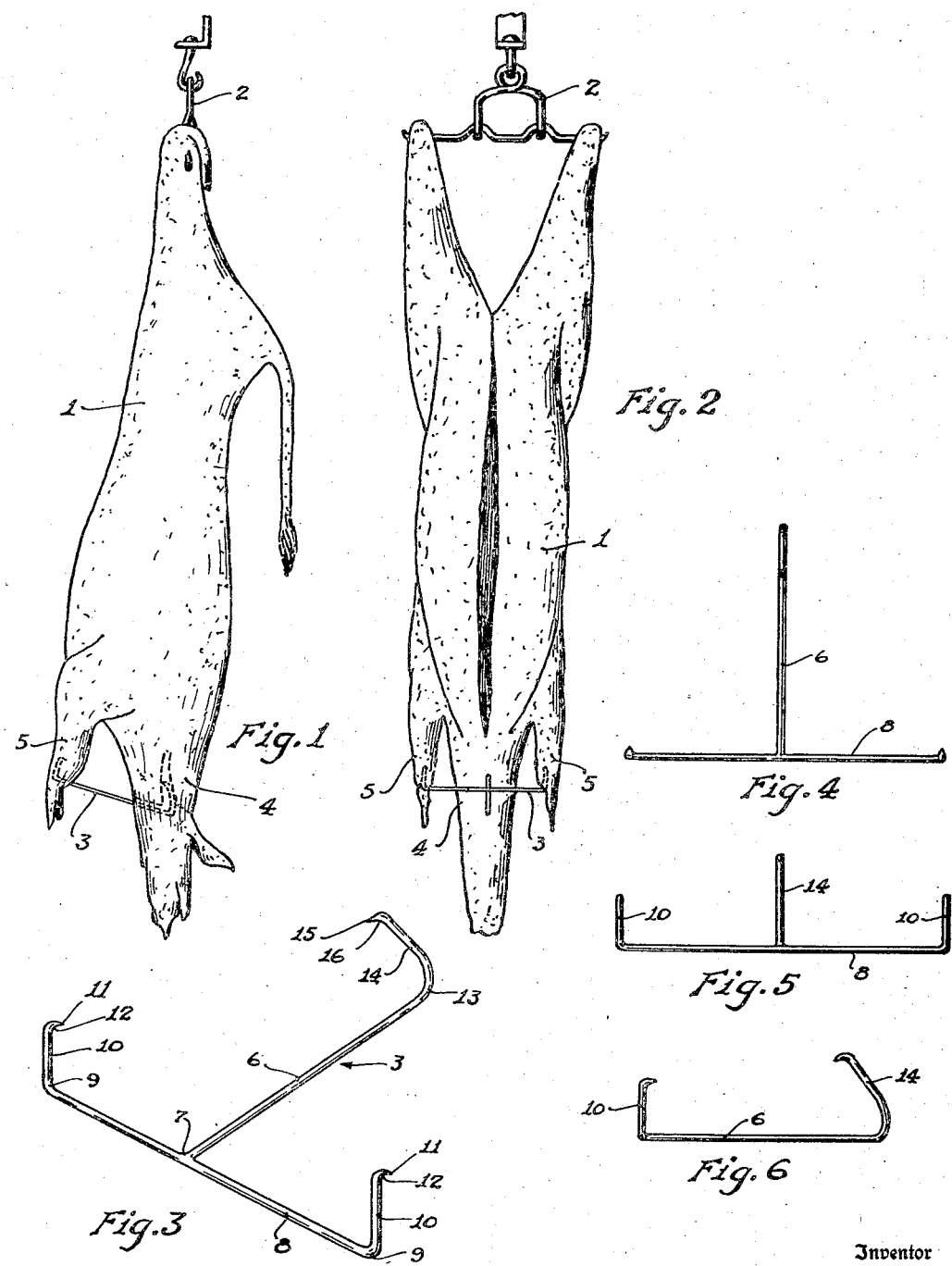

2,140,150

UNITED STATES PATENT OFFICE 2,140,150

CARCASS TREATMENT MEANS

Leon L. Cadwell, Chicago, Ill., assignor to Industrial Patents Corporation, Chicago, Ill., a corporation of Delaware Application October 11, 1937, Serial No. 168,488

8 Claims. (Cl. 17—44)

This invention relates to a carcass treatment means.

This application is a continuation in part and is directed in part to divisible subject matter of my copending application, Serial No. 115,051, filed December 9, 1936, entitled Calf carcass treatment.

One of the objects of the invention is to provide an improved meat carcass treatment means.

Another object of the invention is to provide means for imparting an improved shape to the neck and forequarters of meat carcasses.

Other objects of the invention will be apparent from the description and claims which follow.

The method employed in the present invention is described and claimed in my copending application, Serial No. 168,487, filed October 11, 1937, entitled Carcass treatment.

The present invention is directed to means adaptable for the treatment of animal carcasses comprising a substantially T-shaped, three-point hook member for securing the foreshanks, forequarters and neck of a freshly killed carcass in relative predetermined position. The hook member is inserted between the spinal cord cavity and the foreshanks of the carcass, preferably while the carcass is still warm, and is left remaining in position until rigor mortis or chilling of the carcass has been completed.

The resultant muscular formation and bone positions of the forequarter cuts of carcasses, treated in accordance with the present invention, are greatly improved, thus providing cuts more pleasing in appearance and capable of commanding the better price in the retail market.

The device of the present invention is also of especial utility in the skinning and bagging of whole animal carcasses for shipment to remote points, in that the neck and foreshanks are suitably aligned relative to the body and brisket of the carcass, thus permitting use of a smaller size bag and also facilitating its application.

Attention is directed to the drawings in which like characters of reference are used to designate similar parts.

Figure 1 is a side view of a carcass treated in accordance with the present invention.

Figure 2 is a front view of the carcass shown in Figure 1.

Figure 3 is a perspective view showing one embodiment of the device of the present invention.

Figure 4 is a plan view of the device shown in Figure 3.

Figure 5 is a front view of the device shown in Figure 3.

Figure 6 is a side view of the device shown in Figure 3.

Figure 7 is a perspective view, showing another form of the device characterized in the present invention.

Figure 8 is a side view of the device shown in Figure 7.

Figure 9 is an end view of the device shown in Figure 7.

Figure 10 is an enlarged detail view of the pointed members 18 of the device shown in Figure 7.

Figures 11 and 12 are side views of carcasses treated in accordance with the present invention in which there is employed the device shown in Figure 7.

In accordance with the present invention, freshly killed carcass 1, while still in a warm condition, may be suitably suspended from suspension means 2 for the application of hook member 3 between the neck 4 and foreshanks 5.

In the embodiment of the invention exemplified in Figures 3 to 6, inclusive, hook member 3, of substantially T-shaped configuration, comprises central member 6 rigidly secured at one of its ends 7 to cross member 8. The ends of cross member 8 are bent upwardly substantially at a right angle, as at 9, thus providing prongs 10. The free ends of prongs 10 are pointed, as at 11, and are bent inwardly, as at 12. The opposite end of central member 6 may be broadly curved upwardly and inwardly, as at 13, thus providing prong 14. The free end of prong 14 is pointed, as at 15, and bent inwardly toward prongs 10, as at 16.

In applying hook member 3, prong 14, as shown in Figure 1, is inserted upwardly through the spinal cord cavity of the carcass and secured as by pointed end 15. The neck and foreshanks of the carcass are then retracted relative to each other by an operator and each of the prongs 10 secured within its respective foreshank. Prongs 10 are preferably secured by pointed ends 11 in the hollows made by the bone knuckles and main leg tendons.

In the embodiment of the invention exemplified in Figures 7 to 10, inclusive, there is disclosed a modified form of hook member 3 which is adapted for use over a considerably wide range of carcass sizes. In this embodiment it will be seen that the free ends of cross member 8 are bent inwardly substantially at a right angle, as at 9, thus providing prongs 17 each extending in a line substantially parallel with central member 6. The free end of each of the prongs 17 is flattened as at 18, to a chisellike edge and serves to secure the foreshanks in relative position. The form of chisellike edge 18 is more specifically shown in detail in Figure 10.

As shown in Figures 7 and 8, a second prong member 19 is welded or otherwise rigidly secured, as at 20, to and intermediate the ends of central member 6. It will be noted that prong 19 is pointed, as at 21, and is bent inwardly, as at 22, and is in every respect similar to prong 14, except that it is relatively nearer the edges 18 of prongs 17, and, further, except that it extends from central member 6 in a relatively opposite direction. It will be noted further that the edges 18 of prongs 17 are reversible as to either of the foreshanks of the carcass and may be used interchangeably with either of the prongs 14 or 19.

The purpose of prongs 14 and 19 is to care for the differences in the carcass sizes with which this embodiment of the invention may be used. In Figure 11 the hook member is shown as applied to a carcass of relatively large size in which the prong member 14 is used in combination with prong members 17. In Figure 12 the hook member 12 is shown applied to a carcass of relatively smaller size in which prong member 19 is used in combination with prong members 17.

In practice, the hook members of the present invention are preferably applied to the freshly killed carcass, while still in a warm condition, and are left remaining in position until rigor mortis or chilling of the carcass has been completed. After completion of rigor mortis or chilling of the treated carcass, the hook member may be removed, it being found that the neck and foreshanks will rigidly remain in placed position without its aid.

It is found further that the bone positions and muscular formations secured by the method of the present invention provide improved forequarter cuts having a more plump and stockier appearance. This condition is due, in part, to the spreading of the foreshanks relative to the prongs 10 or 17, and, in part, to the relative retraction of the neck and foreshanks.

It will be seen that the neck and foreshanks of carcasses treated according to the present invention, are suitably aligned relative to the body and brisket of the carcass, and thus are especially adapted for bagging for shipment to remote points, it being found that smaller, more tight fitting bags may be used and that danger of puncturing the bags by the protruding foreshanks is greatly minimized.

I claim:

1. In a device for the treatment of animal carcasses, means for securing the neck and foreshanks in relatively retracted position comprising a substantially T-shaped three-point hook member.

2. In a device for the treatment of animal carcasses, means for securing the neck and foreshanks in relatively retracted position comprising a substantially T-shaped three-point hook member provided at each of its ends with upwardly extending prongs.

3. In a device for the treatment of animal carcasses, means for securing the neck and foreshanks in relatively retracted position comprising a substantially T-shaped three-point hook member provided at each of its ends with upwardly extending prongs, each of the prongs being provided with pointed hooks.

4. In a device for the treatment of animal carcasses, means for securing the neck and foreshanks in relatively retracted position comprising a substantially T-shaped three-point hook member comprising a central member provided at one of its ends with a cross member, the ends of the cross member being bent inwardly in a line substantially parallel with the central member, the opposite end of the central member being provided with an upwardly extending prong member.

5. In a device for the treatment of animal carcasses, means for securing the neck and foreshanks in relatively retracted position comprising a substantially T-shaped three-point hook member comprising a central member provided at one of its ends with a cross member, the ends of the cross member being bent inwardly in a line substantially parallel with the central member and provided with chisellike edges, the opposite end of the central member being provided with an upwardly extending pointed prong member.

6. In a device for the treatment of animal carcasses, means for securing the neck and foreshanks in relatively retracted position comprising a substantially T-shaped three-point hook member comprising a central member provided at one end of its ends with a cross member, the ends of the cross member being bent inwardly in a line substantially parallel with the central member, the opposite end of the central member being provided with an upwardly extending prong member, and a second prong member extending from the central member at a point intermediate the first prong member and the central member.

7. In a device for the treatment of animal carcasses, means for securing the neck and foreshanks in relatively retracted position comprising a substantially T-shaped three-point hook member comprising a central member provided at one of its ends with a cross member, the ends of the cross member being bent inwardly in a line substantially parallel with the central member, the opposite end of the central member being provided with an upwardly extending prong member, and a second prong member extending from the central member at a point intermediate the first prong member and the central member, the second prong member being extended from the central member in a direction relatively opposite the first prong member.

8. In a means for securing the neck and foreshanks of animal carcasses in relatively retracted position including a substantially T-shaped three-point hook member, prongs provided with chisellike edges.

LEON L. CADWELL.

CERTIFICATE OF CORRECTION.

Patent No. 2,140,150. December 13, 1938.

LEON L. CADWELL.

It is hereby certified that error appears in the printed specification of the above numbered patent requiring correction as follows: Page 2, second column, line 38, claim 6, strike out the word "end"; and that the said Letters Patent should be read with this correction therein that the same may conform to the record of the case in the Patent Office.

Signed and sealed this 31st day of January, A. D. 1939.

Henry Van Arsdale (Seal) Acting Commissioner of Patents.